US012651602B2

(12) United States Patent
Lee et al.

(10) Patent No.: US 12,651,602 B2
(45) Date of Patent: Jun. 9, 2026

(54) SERVER DEVICE, CONTROL METHOD OF SERVER DEVICE, AND IOT SYSTEM

(71) Applicant: SAMSUNG ELECTRONICS CO., LTD., Suwon-si (KR)

(72) Inventors: Jungkun Lee, Suwon-si (KR); Miyoung Lee, Suwon-si (KR); Jueun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 132 days.

(21) Appl. No.: 18/409,122

(22) Filed: Jan. 10, 2024

(65) Prior Publication Data

US 2024/0312464 A1     Sep. 19, 2024

Related U.S. Application Data

(63) Continuation of application No. PCT/KR2023/020490, filed on Dec. 13, 2023.

(30) Foreign Application Priority Data

Mar. 13, 2023     (KR) ........................ 10-2023-0032861

(51) Int. Cl.
*G10L 15/30*          (2013.01)
*G10L 15/22*          (2006.01)

(52) U.S. Cl.
CPC .............. *G10L 15/30* (2013.01); *G10L 15/22* (2013.01)

(58) Field of Classification Search
USPC ..................................................... 704/1–504
See application file for complete search history.

(56) References Cited

U.S. PATENT DOCUMENTS

| 11,275,440 | B2 | 3/2022 | Haga et al. | |
| 11,322,144 | B2 | 5/2022 | Maeng et al. | |
| 11,374,782 | B2 * | 6/2022 | Kang .................... | G06F 3/0482 |

(Continued)

FOREIGN PATENT DOCUMENTS

| CN | 120283279 | A * | 7/2025 | ......... H04L 12/2803 |
| EP | 4607511 | A1 * | 8/2025 | ............. G10L 15/22 |

(Continued)

OTHER PUBLICATIONS

International Search Report dated Apr. 9, 2024 for International Application No. PCT/KR2023/020490.

(Continued)

*Primary Examiner* — Marcus T Riley
(74) *Attorney, Agent, or Firm* — STAAS & HALSEY LLP

(57)          ABSTRACT

Disclosed is a server device including a communication circuitry configured to communicate with a first electronic device, and a second electronic device configured to connect to the first electronic device via a network and to provide a voice guidance function; and a processor configured to perform control to: control the communication circuitry to receive state change information of the first electronic device, and control the communication circuitry to transmit, to the second electronic device, the received state change information and a command to cause the second electronic device, connected to the first electronic device via the network, to provide the voice guidance function according to a user's operation of the first electronic device.

12 Claims, 13 Drawing Sheets

(56)                References Cited

U.S. PATENT DOCUMENTS

| | | | |
|---|---|---|---|
| 11,632,814 | B2 | 4/2023 | Kwon et al. |
| 11,671,806 | B2 * | 6/2023 | Kang ..................... H04W 4/06 370/329 |
| 12,093,507 | B2 | 9/2024 | Torikai et al. |
| 2016/0063894 | A1 | 3/2016 | Lee |
| 2017/0230236 | A1 * | 8/2017 | Kim ..................... H04L 7/0008 |
| 2018/0174406 | A1 | 6/2018 | Arashi et al. |
| 2018/0367330 | A1 * | 12/2018 | Kang ................. H04L 12/2827 |
| 2019/0113899 | A1 * | 4/2019 | Jeong ................... H04L 67/125 |
| 2021/0037472 | A1 * | 2/2021 | Kim ..................... H04L 69/163 |
| 2021/0250744 | A1 * | 8/2021 | Kang ................... H04W 76/14 |
| 2024/0312464 | A1 * | 9/2024 | Lee ......................... G10L 15/22 |

FOREIGN PATENT DOCUMENTS

| | | |
|---|---|---|
| JP | 2004-254006 A | 9/2004 |
| JP | 2008-65420 A | 3/2008 |
| JP | 2018-101828 A | 6/2018 |
| JP | 6365338 | 8/2018 |
| JP | 6654743 B2 | 2/2020 |
| JP | 6976126 | 12/2021 |
| KR | 10-1995-0010581 A | 4/1995 |
| KR | 10-2006-0039825 A | 5/2006 |
| KR | 10-2007-0076295 A | 7/2007 |
| KR | 10-0828559 B1 | 5/2008 |
| KR | 10-2016-0026431 A | 3/2016 |
| KR | 10-2019-0106887 | 9/2019 |
| KR | 10-2019-0122457 A | 10/2019 |
| KR | 10-2177302 B1 | 11/2020 |
| KR | 10-2324740 B1 | 11/2021 |
| KR | 10-2363367 B1 | 2/2022 |
| KR | 10-2022-0134811 A | 10/2022 |
| KR | 20240138927 A * | 9/2024 | ............. G16Y 40/35 |
| WO | WO 02/50818 A1 | 6/2002 |
| WO | WO 2019/178229 A1 | 9/2019 |
| WO | WO 2023/013095 A1 | 2/2023 |
| WO | WO-2024191009 A1 * | 9/2024 | ............. G16Y 40/35 |

OTHER PUBLICATIONS

Written Opinion of the International Searching Authority dated Apr. 9, 2024 for International Application No. PCT/KR2023/020490.
Extended European Search report dated Feb. 20, 2026 for European Application No. 23927729.6.

* cited by examiner

FIG. 12

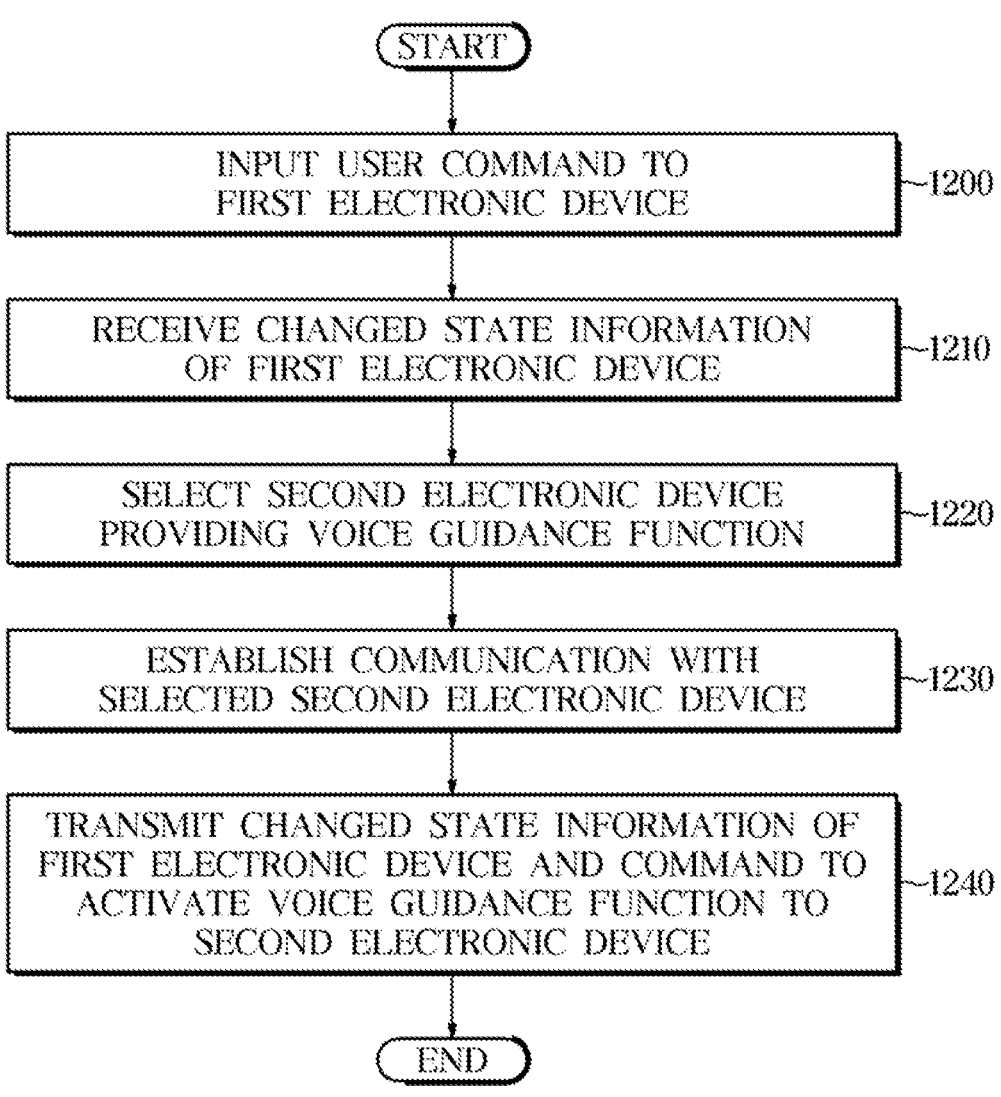

START

INPUT USER COMMAND TO
FIRST ELECTRONIC DEVICE — 1200

RECEIVE CHANGED STATE INFORMATION
OF FIRST ELECTRONIC DEVICE — 1210

SELECT SECOND ELECTRONIC DEVICE
PROVIDING VOICE GUIDANCE FUNCTION — 1220

ESTABLISH COMMUNICATION WITH
SELECTED SECOND ELECTRONIC DEVICE — 1230

TRANSMIT CHANGED STATE INFORMATION OF
FIRST ELECTRONIC DEVICE AND COMMAND TO
ACTIVATE VOICE GUIDANCE FUNCTION TO
SECOND ELECTRONIC DEVICE — 1240

END

SERVER DEVICE, CONTROL METHOD OF SERVER DEVICE, AND IOT SYSTEM

CROSS-REFERENCE TO RELATED APPLICATIONS

This is a continuation application of International Application No. PCT/KR2023/020490, filed Dec. 13, 2023, which is incorporated herein by reference in its entirety, it being further noted that foreign priority benefit is based upon Korean Patent Application No. 10-2023-0032861, filed Mar. 13, 2023, which is incorporated by reference herein in its entirety.

TECHNICAL FIELD

The disclosure relates to a server device, a control method of a server device, and an Internet of Things (IoT) system, and more specifically, to a method for providing voice guidance in a home appliance included in electronic devices.

BACKGROUND ART

The Internet was primarily developed to enable computers to communicate with each other using the TCP/IP protocol. Recently, research is underway to enable all things capable of identification, computation, and communication to communicate with each other via the Internet, and such technology that enables all things to perform communication is called the Internet of Things (hereinafter, IoT).

Electronic devices that provide voice guidance in response to user interaction with the device have been developed. However, users with low vision, such as the visually impaired, may not be able to operate electronic devices that do not support voice guidance.

DISCLOSURE

Technical Solution

The disclosure is directed to providing a server device that enables a second electronic device to support a voice guidance function instead of a first electronic device that does not support the voice guidance function based on a user's operation of the first electronic device, a control method of the server device, and an Internet of Things (IoT) system.

Technical objects that can be achieved by the disclosure are not limited to the above-mentioned objects, and other technical objects not mentioned will be clearly understood by one of ordinary skill in the technical art to which the disclosure belongs from the following description.

According to an embodiment, a server device may include a communication circuitry configured to communicate with a first electronic device and a second electronic device configured to connect to the first electronic device via a network and to provide a voice guidance function; and a processor configured to perform control to: control the communication circuitry to receive state change information of the first electronic device, and control the communication circuitry to transmit, to the second electronic device, the received state change information and a command to cause the second electronic device, connected to the first electronic device via the network, to provide the voice guidance function according to a user's operation of the first electronic device.

According to an embodiment, the second electronic device to which the received state change information and the command is transmitted may be a second electronic device of a plurality of second electronic devices that the communication circuitry may be configured to communicate with, and that may each be configured to connect to the first electronic device via the network and to provide a voice guidance function, and the second electronic device of the plurality of second electronic devices to which the received state change information and the command is transmitted may have a distance from the first electronic device that is less than or equal to a preset reference distance.

According to an embodiment, the second electronic device to which the received state change information and the command is transmitted may be a second electronic device of a plurality of second electronic devices that the communication circuitry may be configured to communicate with, and that may each be configured to connect to the first electronic device via the network and may provide a voice guidance function, and that each may have a priority set by the user, and the second electronic device of the plurality of second electronic devices to which the received state change information and the command is transmitted may have a highest priority of the plurality of second electronic devices.

According to an embodiment, the second electronic device to which the received state change information and the command is transmitted may be a second electronic device of a plurality of second electronic devices that the communication circuitry may be configured to communicate with, and that may each be configured to connect to the first electronic device via the network and to provide a voice guidance function, at least one second electronic device of the plurality of second electronic devices may be set by the user not to provide a voice guidance function, and the processor may be further configured to perform control to exclude the at least one second electronic device of the plurality of second electronic devices from being a target for transmitting the received state change information and the command.

According to an embodiment, the processor may be further configured to perform control to control the communication circuitry to transmit, to the second electronic device, a command to deactivate the voice guidance function based on not receiving updated state change information of the first electronic device within a preset reference period of time.

According to an embodiment, the second electronic device may be configured to reactivate the voice guidance function based on receiving a preset user input within a reference period of time after the command to deactivate the voice guidance function is transmitted.

According to an embodiment, a control method of a server device may include receiving state change information from a first electronic device; and transmitting, to a second electronic device configured to connect to the first electronic device via a network and to provide a voice guidance function, the received state change information and a command to cause the second electronic device, connected to the first electronic device via the network, to provide the voice guidance function according to a user's operation of the first electronic device.

According to an embodiment, the second electronic device to which the received state change information and the command is transmitted may be a second electronic device of a plurality of second electronic device that the server device may be configured to communicate with, and that may each be configured to connect to the first electronic device via the network and to provide a voice guidance function, and the second electronic device of the plurality of second electronic devices to which the received state change information and the command is transmitted may have a distance from the first electronic device that is less than or equal to a preset reference distance.

According to an embodiment, the second electronic device to which the received state change information and the command is transmitted may be a second electronic device of a plurality of second electronic devices that the server device may be configured to communicate with, and that may each be configured to connect to the first electronic device via the network and to provide a voice guidance function, and that each may have a priority set by the user, and the second electronic device of the plurality of second electronic devices to which the received state change information and the command is transmitted may have a highest priority of the plurality of second electronic devices.

According to an embodiment, the second electronic device to which the received state change information and the command is transmitted may be a second electronic device of a plurality of second electronic devices that the server device may be configured to communicate with, and that may each be configured to connect to the first electronic device via the network and to provide a voice guidance function, at least one second electronic device of the plurality of second electronic devices may be set by the user not to provide a voice guidance function, and the control method of the server device may further include excluding the at least one second electronic device of the plurality of second electronic devices from being a target for the transmitting the received state change information and the command.

According to an embodiment, the control method of the server device may further include transmitting, to the second electronic device, a command to deactivate the voice guidance function based on not receiving the updated state change information from the first electronic device within a preset reference period of time.

According to an embodiment, the control method of the server device may further include reactivating the voice guidance function based on receiving a preset user input within a reference period of time after the transmitting, to the second electronic device, the command to deactivate the voice guidance function.

According to an embodiment, an Internet of Things (IoT) system may include a first electronic device: a second electronic device configured to connect to the first electronic device via a network and to provide a voice guidance function; and a server device configured to communicate with the first electronic device and the second electronic device: wherein the first electronic device is configured to transmit state change information to the server device, and the server device is configured to transmit, to the second electronic device, the received state change information and a command to cause the second electronic device, connected to the first electronic device via the network, to provide the voice guidance function according to a user's operation of the first electronic device.

According to an embodiment of an Internet of Things (IoT) system, the second electronic device to which the received state change information and the command is transmitted may be a second electronic device of a plurality of second electronic devices that may each be configured to communicate with the server device, and to connect to the first electronic device via the network and to provide a voice guidance function, and the second electronic device of the plurality of second electronic devices to which the received state change information and the command may be transmitted has a distance from the first electronic device that may be less than or equal to a preset reference distance.

According to an embodiment of an Internet of Things (IoT) system, the second electronic device to which the received state change information and the command is transmitted may be a second electronic device of a plurality of second electronic devices that may each be configured to communicate with the server device, and to connect to the first electronic device via the network and to provide a voice guidance function, and that each may have a priority set by the user so that a plurality of priorities set by the user corresponds to the plurality of second electronic devices, and the second electronic device of the plurality of second electronic devices to which the received state change information and the command may be transmitted has a highest priority of the plurality of priorities set by the user.

DESCRIPTION OF DRAWINGS

FIG. 12 is a flowchart illustrating a control method of a server device according to an embodiment.

MODES OF THE DISCLOSURE

Figure 1:
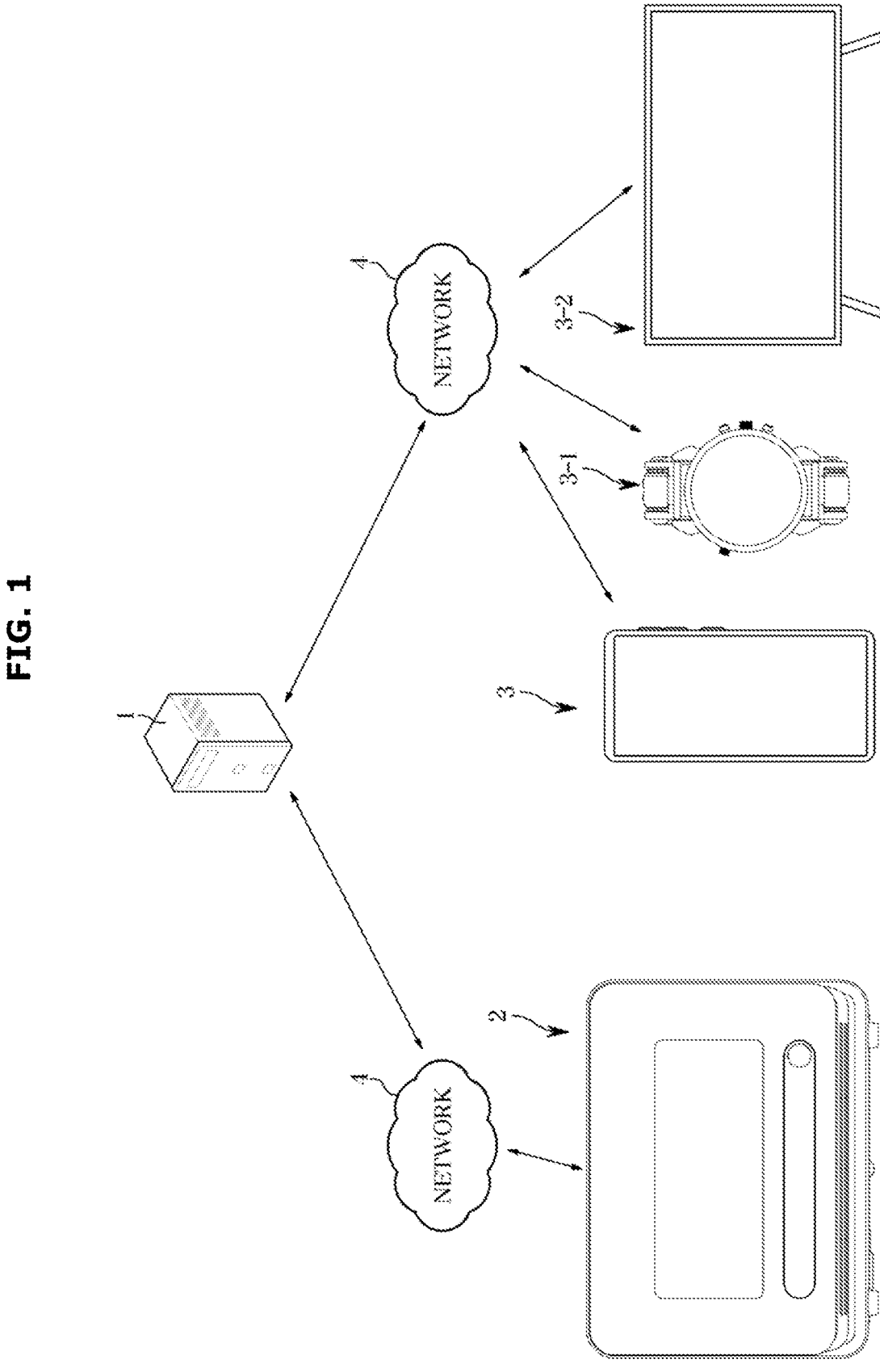
FIG. 1 is a schematic diagram illustrating communication among electronic devices and a server device according to an embodiment.

Various embodiments of the disclosure and terms used therein are not intended to limit the technical features described in the disclosure to particular embodiments, and it should be construed as including various modifications, equivalents, or alternatives of a corresponding embodiment.

With regard to description of drawings, similar reference numerals may be used for similar or related components.

A singular form of a noun corresponding to an item may include one item or a plurality of the items unless context clearly indicates otherwise.

As used herein, each of the expressions "A or B," "at least one of A and B," "at least one of A or B," "A, B, or C," "at least one of A, B, and C," and "at least one of A, B, or C," may include one or all possible combinations of the items listed together with a corresponding expression among the expressions.

It will be understood that the terms "first", "second", etc., may be used only to distinguish one component from another, not intended to limit the corresponding component in other aspects (e.g., importance or order).

When it is said that one (e.g., first) component is "coupled" or "connected" to another (e.g., second) component, with or without the terms "functionally" or "communicatively", it means that one component can be connected to the other component directly (e.g., by wire), wirelessly, or through a third component.

It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

An expression that one component is "connected", "coupled", "supported", or "in contact" with another component includes a case in which the components are directly "connected", "coupled", "supported", or "in contact" with each other and a case in which the components are indirectly "connected", "coupled", "supported", or "in contact" with each other through a third component.

It will also be understood that when one component is referred to as being "on" or "over" another component, it can be directly on the other component or intervening components may also be present.

The term "and/or" includes any and all combinations of one or more of a plurality of associated listed items.

FIG. 1 is a schematic diagram illustrating communication among electronic devices and a server device according to an embodiment.

An electronic device including a first electronic device and a second electronic device may be at least one of various types of home appliances. For example, the electronic device may include a refrigerator, a dishwasher, an electric range, an electric oven, an air conditioner, a clothing care apparatus, a washing machine, a dryer, and a microwave oven, without being limited thereto. For example, the electronic device may include various types of appliances such as a cleaning robot, a vacuum cleaner, a television, and the like. Furthermore, the aforementioned home appliances are only examples.

The electronic device may communicate with a server device 1. The server device 1 may include a communication module capable of communicating with another server device 1 or a user device, at least one processor processing data received from the other server or user device, and at least one memory storing programs for processing data or processed data. The server device 1 may be implemented as a variety of computing devices, such as a workstation, a cloud, a data drive, a data station, and the like. The server device 1 may be implemented as one or more server device 1 physically or logically separated based on a function, detailed configuration of function, or data, and may transmit and receive data through communication between server devices 1 and process the transmitted and received data.

The server device 1 may perform functions such as managing a user account, registering the electronic device in association with the user account, managing or controlling the registered electronic device, and the like. For example, a user may access the server device 1 via the user device and may generate a user account. The user account may be identified by an identifier (ID) and a password set by the user. The server device 1 may register the electronic device to the user account according to a predetermined procedure. For example, the server device 1 may link identification information of the electronic device (such as a serial number or MAC address) to the user account to register, manage, and control the electronic device. A user device may include a communication module capable of communicating with the electronic device or the server device 1, a user interface receiving a user input or outputting information to a user, at least one processor controlling an operation of the user device, and at least one memory storing a program for controlling the operation of the user device.

The user device may be carried by a user, or placed in a user's home or office, or the like. The user device may include a personal computer, a terminal, a portable telephone, a smartphone, a handheld device, a wearable device, and the like, without being limited thereto.

The memory of the user device may store a program for controlling the electronic device, i.e., an application. The application may be sold installed on the user device, or may be downloaded from an external server for installation.

By executing the application installed on the user device by a user, the user may access the server device 1, generate a user account, and perform communication with the server device 1 based on the login user account to register the electronic device.

For example, by operating the electronic device to enable the electronic device to access the server according to a procedure guided by the application installed on the user device, the server device 1 may register the electronic device with the user account by assigning the identification information (such as a serial number or MAC address) of the electronic device to the corresponding user account.

A user may control the electronic device using the application installed on the user device. For example, by logging into a user account with the application installed on the user device, the electronic device registered in the user account appears, and by inputting a control command for the electronic device, the control command may be delivered to the electronic device via the server device 1.

A network 4 may include both a wired network 4 and a wireless network 4. The wired network 4 may include a cable network 4 or a telephone network 4, and the wireless network 4 may include any networks transmitting and receiving a signal via radio waves. The wired network 4 and the wireless network 4 may be connected to each other.

The network 4 may include a Wide Area Network (WAN) such as the Internet, a Local Area Network (LAN) formed around an Access Point (AP), and a short range wireless network 4 not using an AP. The short range wireless network 4 may include Bluetooth™ (IEEE 802.15.1), Zigbee (IEEE 802.15.4), Wi-Fi Direct, Near Field Communication (NFC), and Z-Wave, without being limited thereto.

The AP may connect the electronic device or user device to the WAN to which the server device 1 is connected. The electronic device or the user device may be connected to the server via the WAN 4.

The AP may communicate with the electronic device or the user device using wireless communication such as Wi-Fi™ (IEEE 802.11), Bluetooth™ (IEEE 802.15.1), Zigbee (IEEE 802.15.4), etc., and access the network 4 using wired communication, without being limited thereto.

According to various embodiments, the electronic device may be directly connected to the user device or server device 1 without going through an AP.

The electronic device may be connected to the user device or the server device 1 via the long range wireless network 4 or short range wireless network 4.

For example, the electronic device may be connected to the user device via the short range wireless network 4 (e.g., Wi-Fi Direct).

In another example, the electronic device may be connected to the user device or server device 1 via the network 4 using the long range wireless network 4 (e.g., a cellular communication module).

In still another example, the electronic device may access the network 4 using wired communication, and may be connected to the user device or server device 1 via the network 4.

Upon accessing the network 4 using wired communication, the electronic device may also act as an access point. Accordingly, the electronic device may connect another home appliance to the network 4 to which the server device 1 is connected. Further, the other home appliance may connect the electronic device to the network 4 to which the server device 1 is connected.

The electronic device may transmit information about an operation or state to the other home appliance, the user device, or the server device 1 via the network 4. For example, the electronic device may transmit information about an operation or state to the other home appliance, the user device or the server device 1 upon receiving a request from the server device 1, in response to an event in the electronic device, or periodically or in real time. In response to receiving the information about the operation or state from the electronic device, the server may update the stored information about the operation or state of the electronic device and transmit the updated information about the operation and state of the electronic device to the user device via the network 4. Here, updating the information may include various operations in which existing information is changed, such as adding new information to the existing information, replacing the existing information with new information, and the like.

The electronic device may obtain various information from the other home appliance, the user device, or the server device 1, and may provide the obtained information to a user. For example, the electronic device may obtain information related to a function of the electronic device (e.g., recipes, washing instructions, etc.) from the server and various environment information (e.g., weather, temperature, humidity, etc.), and may output the obtained information via the user interface.

The electronic device may operate according to a control command received from the other home appliance, the user device, or the server device 1. For example, the electronic device may operate in accordance with a control command received from the server device 1, based on a prior authorization obtained from a user to operate in accordance with the control command of the server device 1 even without a user input. Here, the control command received from the server device 1 may include a control command input by the user via the user device or a control command based on preset conditions, without being limited thereto.

The user device may transmit information about a user to the electronic device or the server device 1 through the communication module. For example, the user device may transmit information about a user's location, a user's health status, a user's preference, a user's schedule, etc., to the server. The user device may transmit information about the user to the server based on the user's prior authorization.

The electronic device, the user device, or the server device 1 may use techniques such as artificial intelligence to determine a control command. For example, the server device 1 may receive information about an operation or a state of the electronic device or information about a user of the user device, process the received information using techniques such as artificial intelligence, and transmit a processing result or a control command to the electronic device or the user device based on the processing result.

Hereinafter, an operating principle and embodiments are described with reference to FIG. 2.

Figure 2:
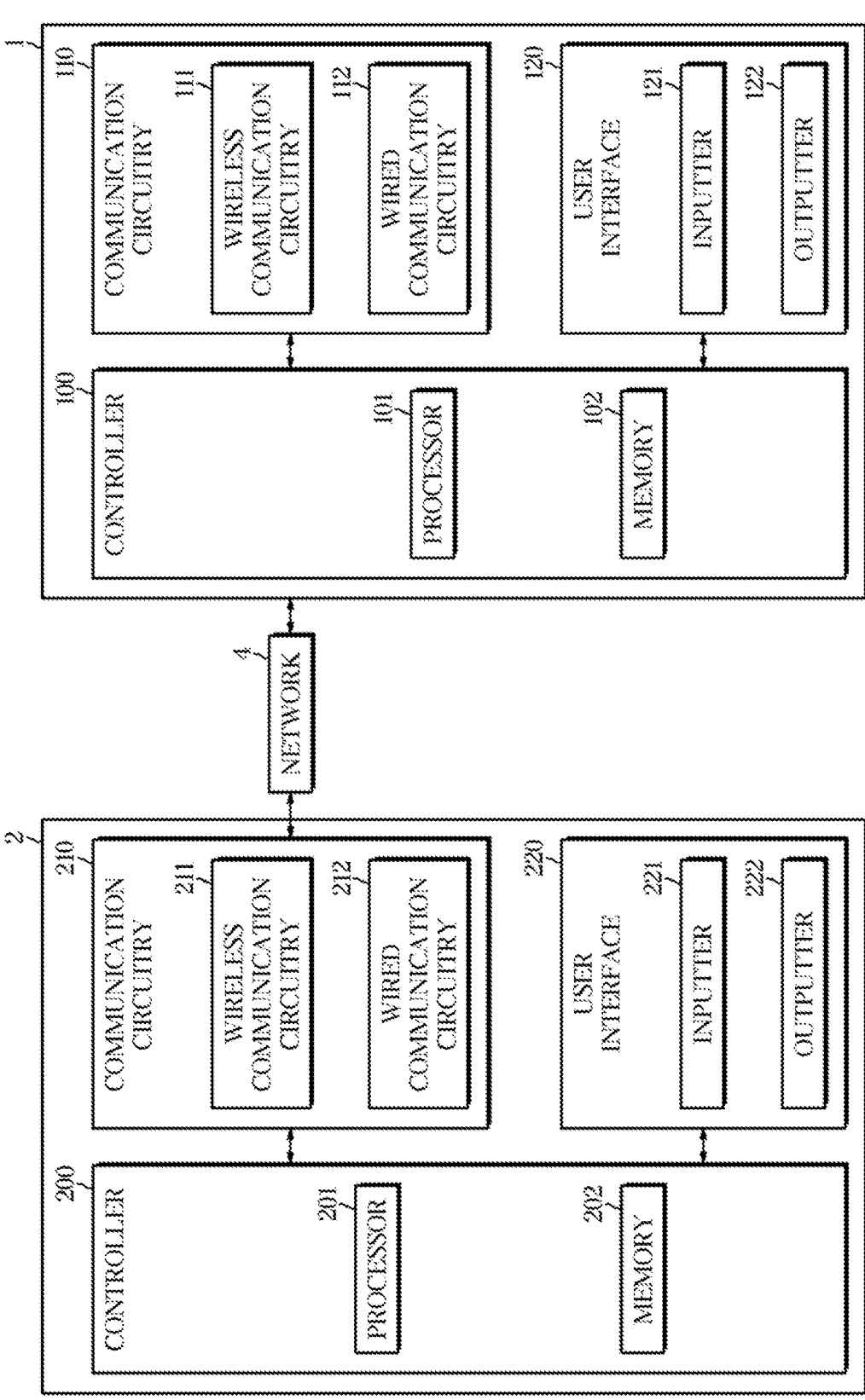
FIG. 2 is a control block diagram illustrating a server device according to an embodiment.

FIG. 2 is a control block diagram illustrating the server device 1 according to an embodiment.

As shown in FIG. 2, the server device 1 according to an embodiment may include a communication circuitry 110 communicating with an electronic device 2 via the network 4, a user interface 120, and a controller 100.

The communication circuitry 110 may be connected to the electronic device 2 including a first electronic device 2 and a second electronic device 2, and transmit and receive data to and from the electronic device 2. In this instance, the first electronic device 2 may refer to an electronic device that does not provide a voice guidance function, and the second electronic device 2 may refer to an electronic device providing a voice guidance function.

Specifically, the communication circuitry 110 may receive state change information of the first electronic device 2, or may transmit the state change information and a command to activate the voice guidance function to the second electronic device 2.

The communication circuitry 110 may include a wireless communication circuitry 111 that wirelessly transmits and receives data to and from external electronic devices 2, and a wired communication circuitry 112 that transmits and receives data to and from external devices by wire.

The wireless communication circuitry 111 may communicate wirelessly with a base station or an AP, and may access a wired communication network through the base station or access point. The wireless communication circuitry 111 may also communicate with external devices connected to the wired communication network via a base station or access point. As described above, the wireless communication circuitry 111 may communicate wirelessly with an AP using Wi-Fi™ (e.g., IEEE 802.11 standard), or communicate with a base station using Global System for Mobile Communications (GSM), Code Division Multiple Access (CDMA), Wideband CDMA (WCDMA), Long Term Evolution (LTE), or Wibro. The wireless communication circuitry 111 may also receive data from external devices via a base station or access point.

Furthermore, the wireless communication circuitry 111 may directly communicate with the external devices.

The wired communication circuitry 112 may access a wired communication network and communicate with external devices via the wired communication network. For example, the wired communication circuitry 112 may access the wired communication network via Ethernet (IEEE 802.3 standard) and receive data from external devices via the wired communication network.

A communication method between the electronic device 2 and the communication circuitry 110 is not limited.

The server device 1 may include the user interface 120. For example, the user interface 120 is provided on an outer surface of the server device 1, and may receive a control command from a user and display information related to an operation of the server device 1.

The user interface 120 may include an inputter 121 receiving a control command and an outputter 122 displaying information related to an operation.

The inputter 121 may be implemented as at least one of an input means such as a touch screen, a push button, a membrane button, a dial, a slider switch, and the like, without being limited thereto.

The outputter 122 may be implemented as a display means such as a Plasma Display Panel (PDP), a Liquid Crystal Display (LCD) panel, a Light Emitting Diode (LED) panel, an Organic Light Emitting Diode (OLED) panel, an Active-matrix Organic Light-Emitting Diode (AMOLED) panel, a Curved Display Panel, and the like, without being limited thereto.

Also, the outputter 122 may be implemented as a Touch Screen Panel (TSP) that further includes a touch input means to detect user contact. In a case where the outputter 122 is implemented as a Touch Screen Panel, a user may input a control command by touching the outputter 122.

The controller 100 outputs a control signal to provide overall control of the server device 1. The controller 100 may include one or more processors 101. In this instance, the processor 101 may be implemented as an array of logic gates, or may be implemented as a combination of the general-purpose microprocessor 101 and a memory 102 storing a program executable in the microprocessor 101.

The memory 102 may store various information required for an operation of the server device 1. Specifically, the memory 102 may store an operating system or a program required for an operation of the server device 1, or store data required for an operation of the server device 1.

For example, the memory 102 may store current state information of the first electronic device 2 and the second electronic device 2. In addition, the memory 102 may include a high-speed random access memory, magnetic disc, Static Random Access Memory (SRAM), Dynamic Random Access Memory (DRAM), Read Only Memory (ROM), and the like, without being limited thereto.

Furthermore, the memory 102 may be detachable from the device. For example, the memory 102 may include a Compact Flash Card (CF Card), a Secure Digital Card (SD Card), a Smart Media Card (SM Card), a Multimedia Card (MMC), or a Memory Stick, without being limited thereto.

The controller 100 may control each component to allow the second electronic device 2 to provide voice guidance according to an user's operation of the first electronic device 2 that does not provide a voice guidance function.

Specifically, based on receiving state change information of the first electronic device 2, the controller 100 may control the communication circuitry 110 to transmit the state change information and a command to activate the voice guidance function to the second electronic device 2.

In addition, the controller 100 may control the communication circuitry 110 to transmit the state change information and the command to activate the voice guidance function to the second electronic device 2 whose distance from the first electronic device 2 is less than or equal to a preset reference distance from among a plurality of second electronic devices 2.

In addition, the controller 100 may control the communication circuitry 110 to transmit the state change information and the command to activate the voice guidance function to the second electronic device 2 with the highest priority based on priorities set by the user.

In addition, the controller 100 may exclude the second electronic device 2, which is set by the user not to use the voice guidance function, from a target for transmitting the state change information and the command to activate the voice guidance function.

In addition, based on the state change information not being received from the first electronic device 2 within a preset reference period of time, the controller 100 may control the communication circuitry 110 to transmit a command to deactivate the voice guidance function to the second electronic device 2. Based on receiving a preset user input from the second electronic device 2 within a reference period of time after transmitting the deactivation command, the controller 100 may reactivate the voice guidance function of the second electronic device 2.

Accordingly, the controller 100 of the server device 1 according to an embodiment may notify the user of an operating state of the first electronic device 2 that does not provide the voice guidance function through the voice guidance function of the second electronic device 2.

According to an embodiment, the electronic device 2 may include the first electronic device 2 and the second electronic device 2, and the electronic device 2 may include a communication circuitry 210 communicating with the server device 1 via the network 4, a user interface 220, and a controller 200.

The communication circuitry 210 may be connected to the server device 1 and may transmit and receive data to and from the server device 1. Specifically, the communication circuitry 210 of the first electronic device 2 may transmit state change information to the server device 1, and the communication circuitry 210 of the second electronic device 2 may receive state change information and a command to activate a voice guidance function from the server device 1.

The communication circuitry 210 may include a wireless communication circuitry 211 that wirelessly transmits and receives data to and from external electronic devices 2, and a wired communication circuitry 212 that transmits and receives data to and from external devices by wire. A configuration of the communication circuitry 210 is the same as the communication circuitry of the server device 1, and thus a detailed description thereof is omitted herein.

The electronic device 2 may include the user interface 220. For example, the user interface 220 is provided on an outer surface of the electronic device 2, and may receive a control command from a user and display information related to an operation of the electronic device 2.

The user interface 220 may include an inputter 221 receiving a control command and an outputter 222 displaying information related to an operation.

The inputter 221 may be implemented as at least one of an input means such as a touch screen, a push button, a membrane button, a dial, a slider switch, and the like, without being limited thereto.

The outputter 222 may be implemented as a display means such as a Plasma Display Panel (PDP), a Liquid Crystal Display (LCD) panel, a Light Emitting Diode (LED) panel, an Organic Light Emitting Diode (OLED) panel, an Active-matrix Organic Light-Emitting Diode (AMOLED) panel, a Curved Display Panel, and the like, without being limited thereto.

Also, the outputter 222 may be implemented as a Touch Screen Panel (TSP) that further includes a touch input means to detect user contact. In a case where the outputter 222 is implemented as a Touch Screen Panel, a user may input a control command by touching the outputter 222.

In this instance, the outputter 222 of each of the first electronic device 2 and the second electronic device 2 may include a speaker. Through the speaker, the first electronic device 2 may output a beep sound related to an operation of the electronic device 2, and the second electronic device 2 may output both beep sound and voice guidance.

The controller 200 outputs a control signal to provide overall control of the electronic device 2. The controller 200 may include one or more processors 201, and a memory 202 may store various information required for an operation of the electronic device 2.

The controller 200 of the first electronic device 2 may control the communication circuitry 210 of the first electronic device 2 to transmit state information and state change information of the first electronic device 2 to the server device 1.

The controller 200 of the second electronic device 2 may control the communication circuitry 210 of the second electronic device 2 to receive the state change information of the first electronic device 2 and a command to activate the voice guidance function.

In addition, the controller 200 of the second electronic device 2 may activate the voice guidance function based on the received activation command, and play voice guidance content corresponding to the received state change information. Based on state change information being updated after the voice guidance function is activated, the controller 200 of the second electronic device 2 may play voice guidance content corresponding to the updated state change information.

Figure 3:
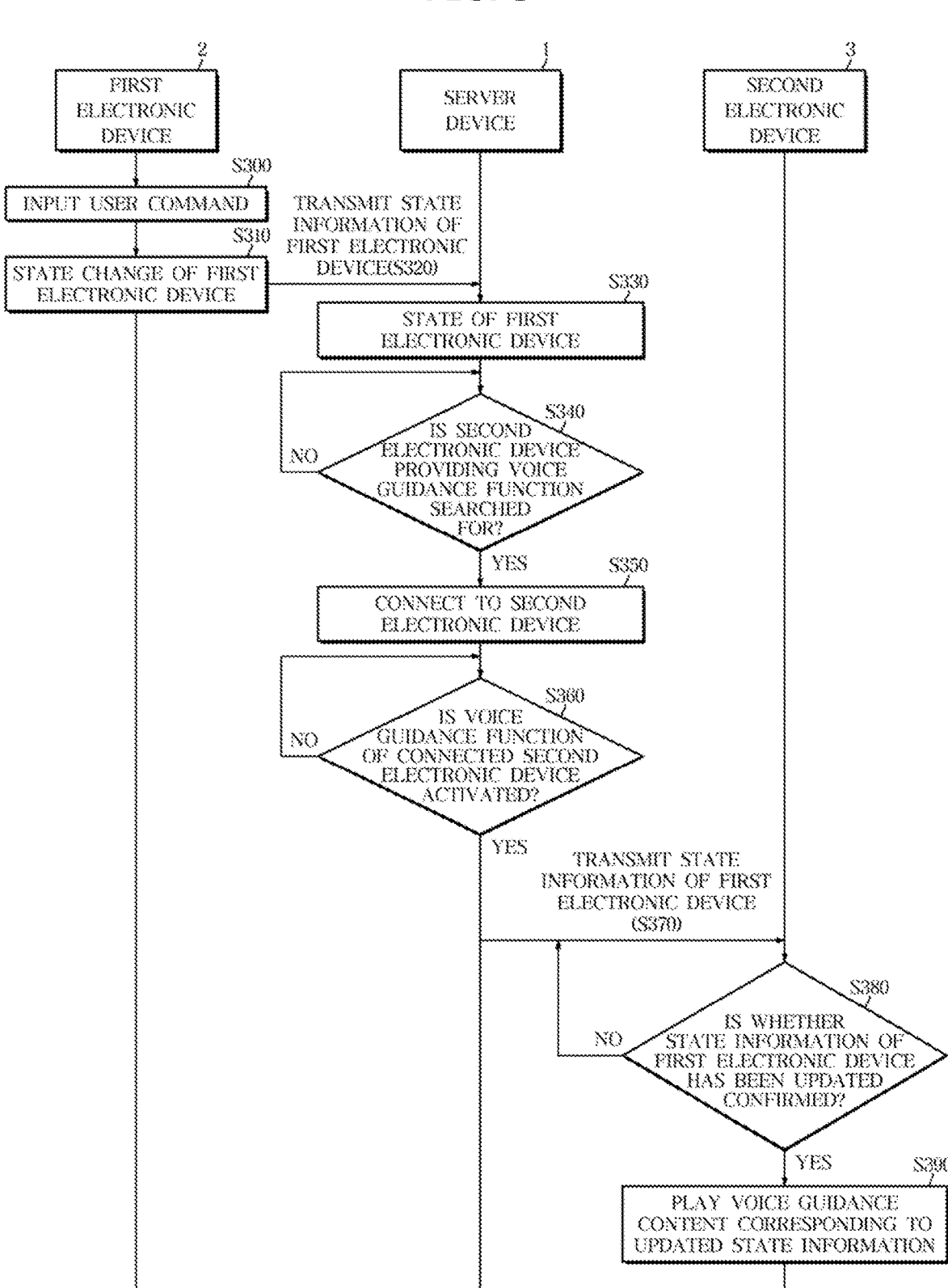
FIG. 3 is a flowchart illustrating operations of electronic devices and a server device according to an embodiment.

FIG. 3 is a flowchart illustrating operations of electronic devices and a server device according to an embodiment.

Referring to FIG. 3, the server device 1 may allow the second electronic device 3 to provide state change information which is information about a change in an operating state of the first electronic device 2 by voice, by interacting with the first electronic device 2 and the second electronic device 3.

The first electronic device 2 may identify whether a user command to control the first electronic device 2 has been input (S300). For example, assuming that the first electronic device 2 is a cooking appliance, the user command may include an input for increasing a cooking temperature of the cooking appliance or an input for selecting a cooking mode. A state of the first electronic device 2 may be changed according to the user's intention based on the user command for controlling the first electronic device 2 (S310).

The first electronic device 2 may transmit, to the server device 1, the state change information of the first electronic device 2 based on the user command (S320).

The server device 1 may update state information of the first electronic device 2 (S330). Based on the state of the first electronic device 2 being updated, the server device 1 may search for the second electronic device 3 providing a voice guidance function in order for the second electronic device 3 to provide voice guidance (S340). For example, the second electronic device 3 providing the voice guidance function may include a smartphone, smartwatch, and smart earphones.

In response to the second electronic device 3 providing the voice guidance function being searched for (Yes in S340), the server device 1 may establish communication with the searched second electronic device 3 (S350).

The server device 1 may identify whether the voice guidance function is activated in the connected second electronic device 3 (S360). To this end, the server device 1 may store and maintain information about whether the second electronic device 3 supports the voice guidance function in the memory 102.

Based on the voice guidance function identified as activated in the connected second electronic device 3 (Yes in S360), the server device 1 may transmit the state change information of the first electronic device 2 to the second electronic device 3 (S370).

The second electronic device 3 may receive the state change information of the first electronic device 2 and confirm whether the state information of the first electronic device 2 has been updated (S380). For example, it may be identified that the state information of the first electronic device 2 has been updated based on a change in a cooking mode of cooking appliance which is the first electronic device 2.

Based on the state information of the first electronic device confirmed as updated (Yes in S380), the second electronic device 3 may activate the voice guidance function to play voice guidance content corresponding to the updated state information of the first electronic device 2 (S390).

According to an Internet of Things (IoT) system according to an embodiment, even a user with low vision, such as the visually impaired, is able to operate an electronic device that does not provide a voice guidance function, by receiving real-time guidance without having to memorize an operation process. Accordingly, user convenience in using IoT devices may be increased.

In FIG. 4 to FIG. 7, it is assumed that the first electronic device 2 that does not provide a voice guidance function is a washing machine, and the second electronic device 3 providing a voice guidance function is a smartphone.

Figure 4:
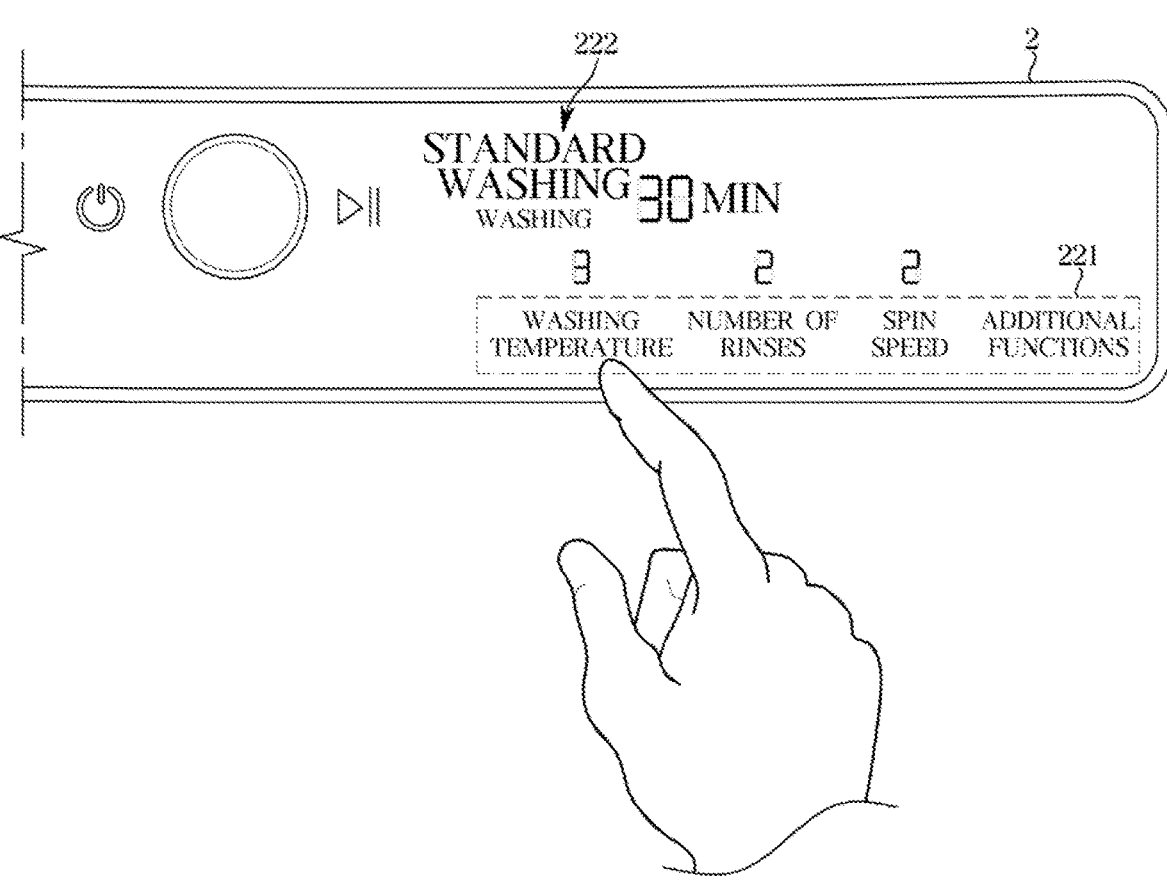
FIG. 4 illustrates that a user operates a first electronic device in an Internet of Things (IoT) system according to an embodiment.
Figure 5:
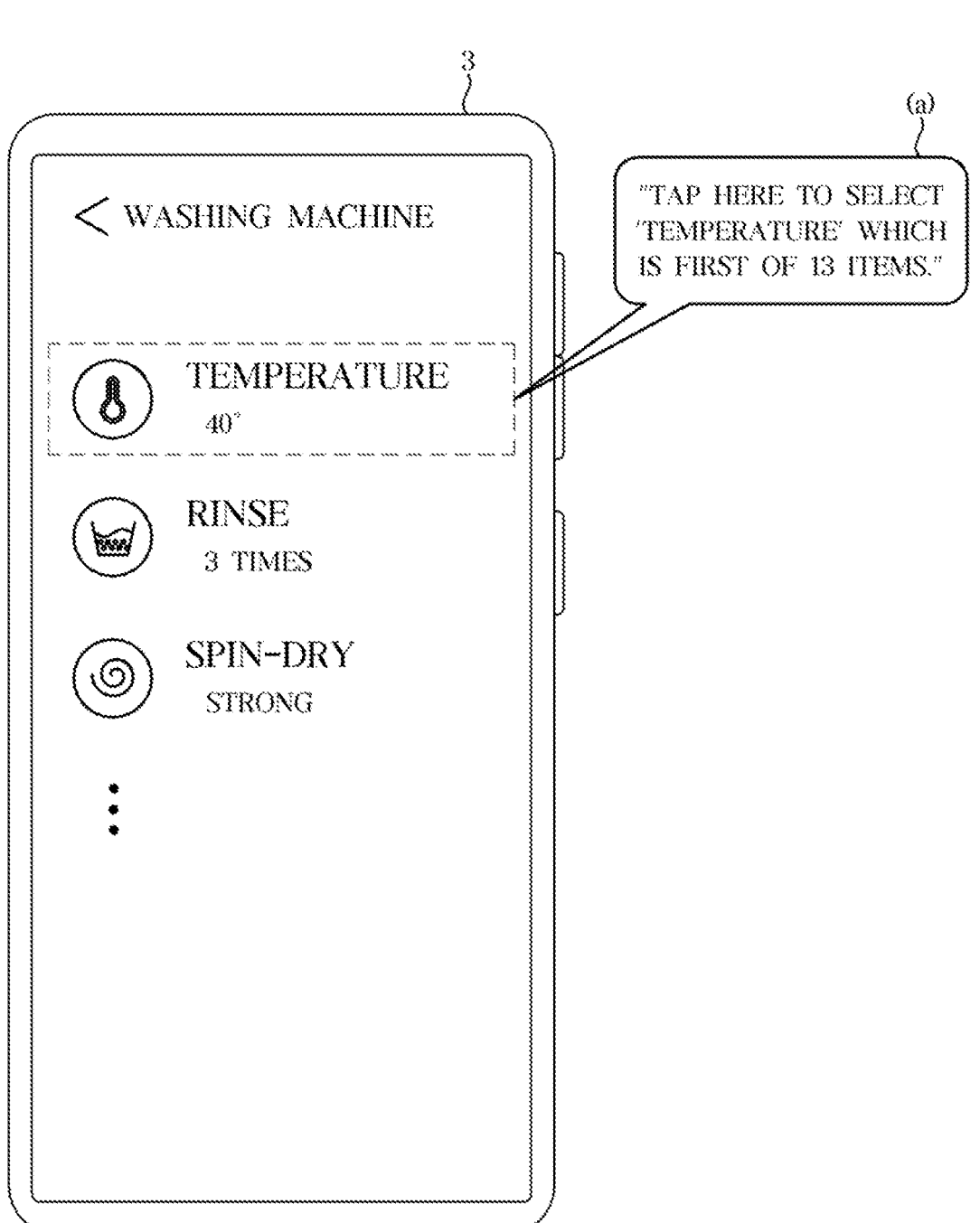
FIG. 5 illustrates a second electronic device providing voice guidance in response to a user's operation of a first electronic device in an IoT system according to an embodiment.

FIG. 4 illustrates that a user operates the first electronic device 2 in an IoT system according to an embodiment. FIG. 5 illustrates the second electronic device 3 providing voice guidance in response to a user's operation of the first electronic device 2 in an IoT system according to an embodiment.

The first electronic device 2 may include an inputter 221 that may receive input about a washing temperature, the number of rinses, a spin speed, and additional functions, and an outputter 222 displaying a washing mode and a remaining time.

A user may input a command to set a washing temperature to the inputter 221 of the first electronic device 2. Accordingly, the first electronic device 2 may transmit state change information changed according to the user's command to the server device 1. For example, the user may change a washing temperature by touching the inputter 221 for changing the washing temperature, and information about the changed washing temperature may be transmitted to the server device 1.

The server device 1 may receive the state change information, which is information about the changed washing temperature, and may search for the second electronic device 3 providing a voice guidance function from among electronic devices included in the home network 4.

In response to a plurality of second electronic devices 3 being searched for, the server device 1 may establish communication with the second electronic device 3 whose distance from the first electronic device 2 is less than or equal to a preset reference distance. Alternatively, the server device 1 may establish communication with the second electronic device 3 with the highest priority according to priorities preset based on user settings.

In this instance, however, the server device 1 may exclude the second electronic device 3, which is set not to use the voice guidance function, from a target for establishing communication. Accordingly, the server device 1 may not transmit the state change information and the command to activate the voice guidance function to the second electronic device 3 excluded from the target for establishing communication.

The server device 1 may establish communication with the second electronic device 3 whose voice guidance function is set to be used, from among the second electronic devices 3 whose distance from the first electronic device 2 is less than or equal to the preset reference distance, or the second electronic devices 3 with the highest priority.

Thereafter, the server device 1 may transmit, to the second electronic device 3, the state change information and the command to activate the voice guidance function received from the first electronic device 2 through the established communication.

Referring to FIG. 5, the smartphone corresponding to the second electronic device 3 may receive washing temperature change information corresponding to the state change information of the washing machine from the server, and may identify that the state information of the washing machine has changed. In addition, the second electronic device 3 may activate the voice guidance function based on receiving the command to activate the voice guidance function from the server.

Specifically, the smartphone corresponding to the second electronic device 3 may provide voice guidance by executing an application for providing voice guidance. For example, as shown in FIG. 5, the smartphone may provide a voice message about a temperature setting, because the state change information of the washing machine is related to the washing temperature setting.

That is, the smartphone may provide voice guidance on a washing temperature setting item selected by the user from among a total of 13 items settable in the washing machine, and also provide voice guidance on user's operation required to change the washing temperature. Specifically, in response to the user's input for a washing temperature change button, the smartphone may provide voice guidance in a form of a voice message including the total number of items, order, content, and operational instructions, such as "Tap here to select 'temperature' which is the first item of 13 items."

Accordingly, the user may confirm the function of the selected item, and may also confirm the user's operation required to select the function.

Figure 6:
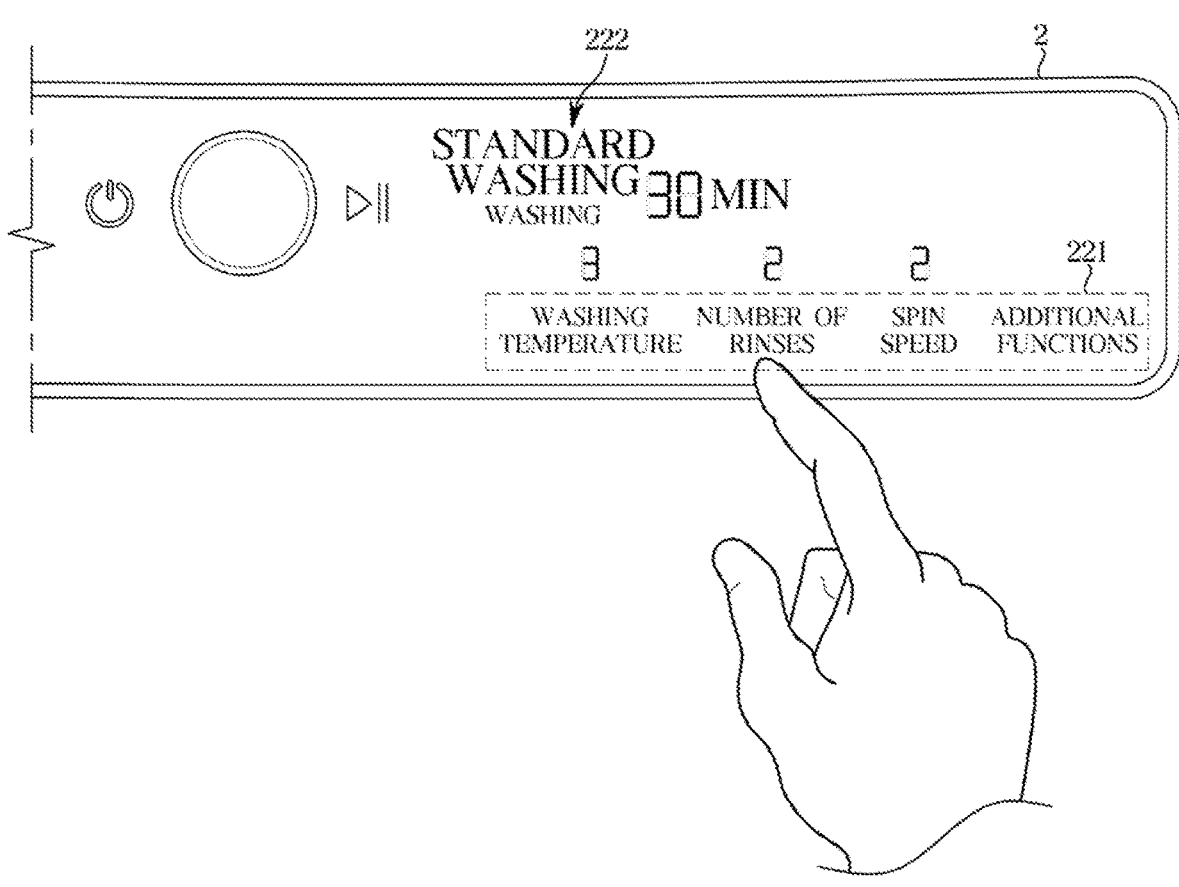
FIG. 6 illustrates that a user operates a first electronic device in an IoT system according to an embodiment.
Figure 7:
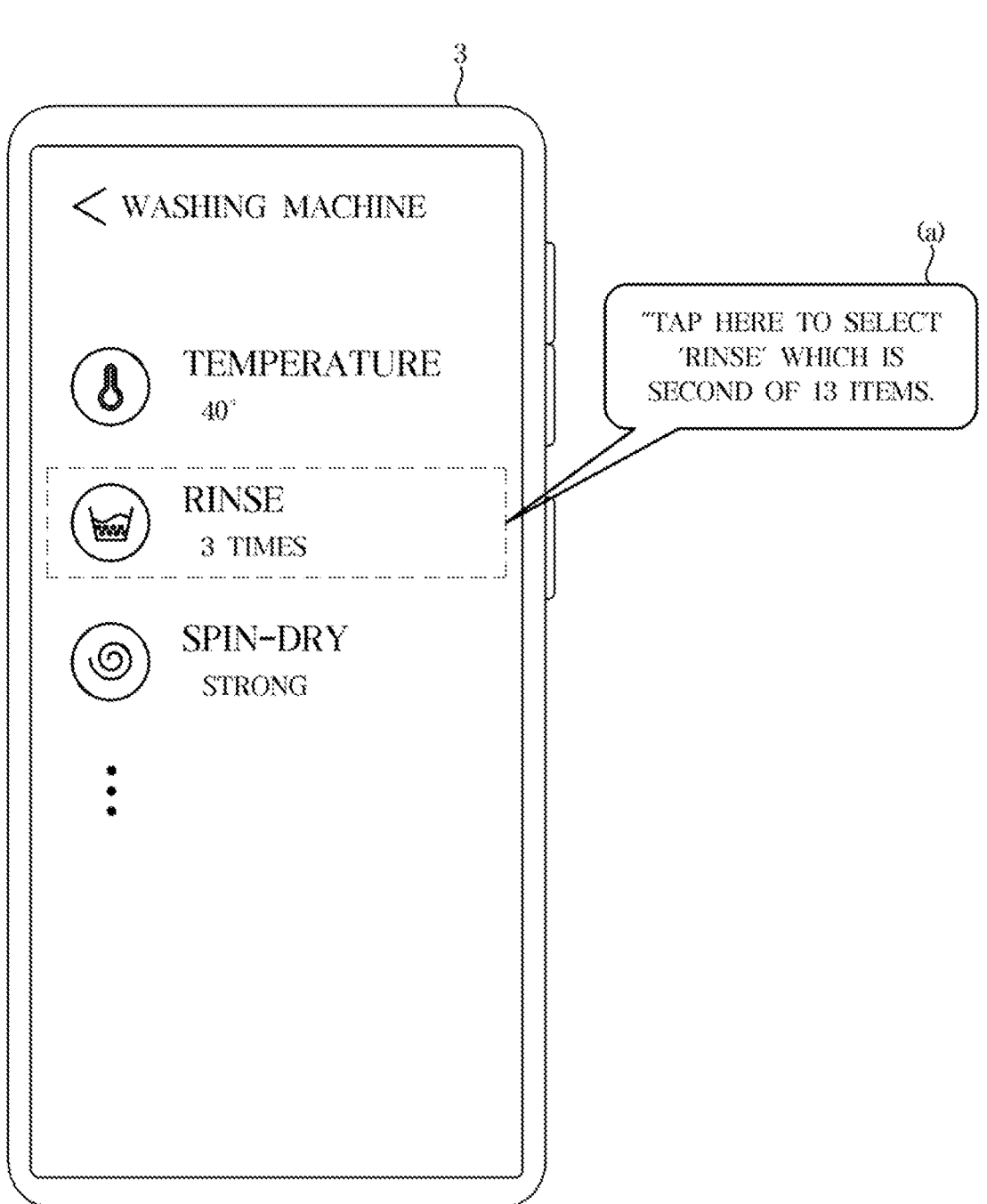
FIG. 7 illustrates a second electronic device providing voice guidance in response to a user's operation of a first electronic device in an IoT system according to an embodiment.

FIG. 6 illustrates that a user operates the first electronic device 2 in an IoT system according to an embodiment. FIG. 7 illustrates the second electronic device 3 providing voice guidance in response to a user's operation of the first electronic device 2 in an IoT system according to an embodiment.

As described above, the first electronic device 2 may include the inputter 221 that may receive input about a washing temperature, the number of rinses, a spin speed, and additional functions, and the outputter 222 including (**display-ing a washing mode and a remaining time.

A user may input a command to set the number of rinses to the inputter 221 of the first electronic device 2. Accordingly, the first electronic device 2 may transmit state change information changed according to the user's command to the server device 1. For example, the user may change the number of rinses by touching the inputter 221 for changing the number of rinses, and information about the changed number of rinses may be transmitted to the server device 1.

The server device 1 may receive the state change information, which is information about the changed number of rinses, and search for the second electronic device 3 providing a voice guidance function among electronic devices included in the home network 4.

Similarly to in FIG. 5, the server device 1 may establish communication with the second electronic device 3 whose voice guidance function is set to be used, from among the second electronic devices 3 whose distance from the first electronic device 2 is less than or equal to the preset reference distance, or the second electronic devices 3 with the highest priority.

Thereafter, the server device 1 may transmit, to the second electronic device 3, the state change information and a command to activate the voice guidance function received from the first electronic device 2 through the established communication.

Referring to FIG. 7, the smartphone corresponding to the second electronic device 3 may receive information about a change in the number of rinses corresponding to the state change information of the washing machine from the server, and may identify that the state information of the washing machine has changed. In addition, the second electronic device 3 may activate the voice guidance function based on receiving the command to activate the voice guidance function from the server.

Specifically, the smartphone corresponding to the second electronic device 3 may provide voice guidance by executing an application for providing voice guidance. For example, as shown in FIG. 7, because the state change information of the washing machine relates to the setting for the number of rinses, the smartphone may provide a voice message about the setting for the number of rinses.

That is, the smartphone may provide voice guidance on the item for setting for the number of rinses selected by the user from among a total of 13 items settable in the washing machine, and also provide voice guidance on user's operations required to change the number of rinses. Specifically, in response to the user's input for a button for changing the number of rinses, the smartphone may provide voice guidance in a form of a voice message including the total number of items, order, content, and operational instructions, such as "Tap here to select 'rinse' which is the second item of 13 items.

Users with low vision may not be able to visually confirm which command has been input into an IoT device. According to the IoT system according to an embodiment, a user with low vision may be able to confirm whether he or she has operated a setting button for washing temperature or the number of rinses in real time through voice guidance. That is, even though the user operates an electronic device without a voice guidance function, the user may receive voice guidance through the electronic device equipped with voice guidance function instead of the electronic device without the voice guidance function, thereby achieving a similar effect as if the voice guidance function had been added.

Figure 8:
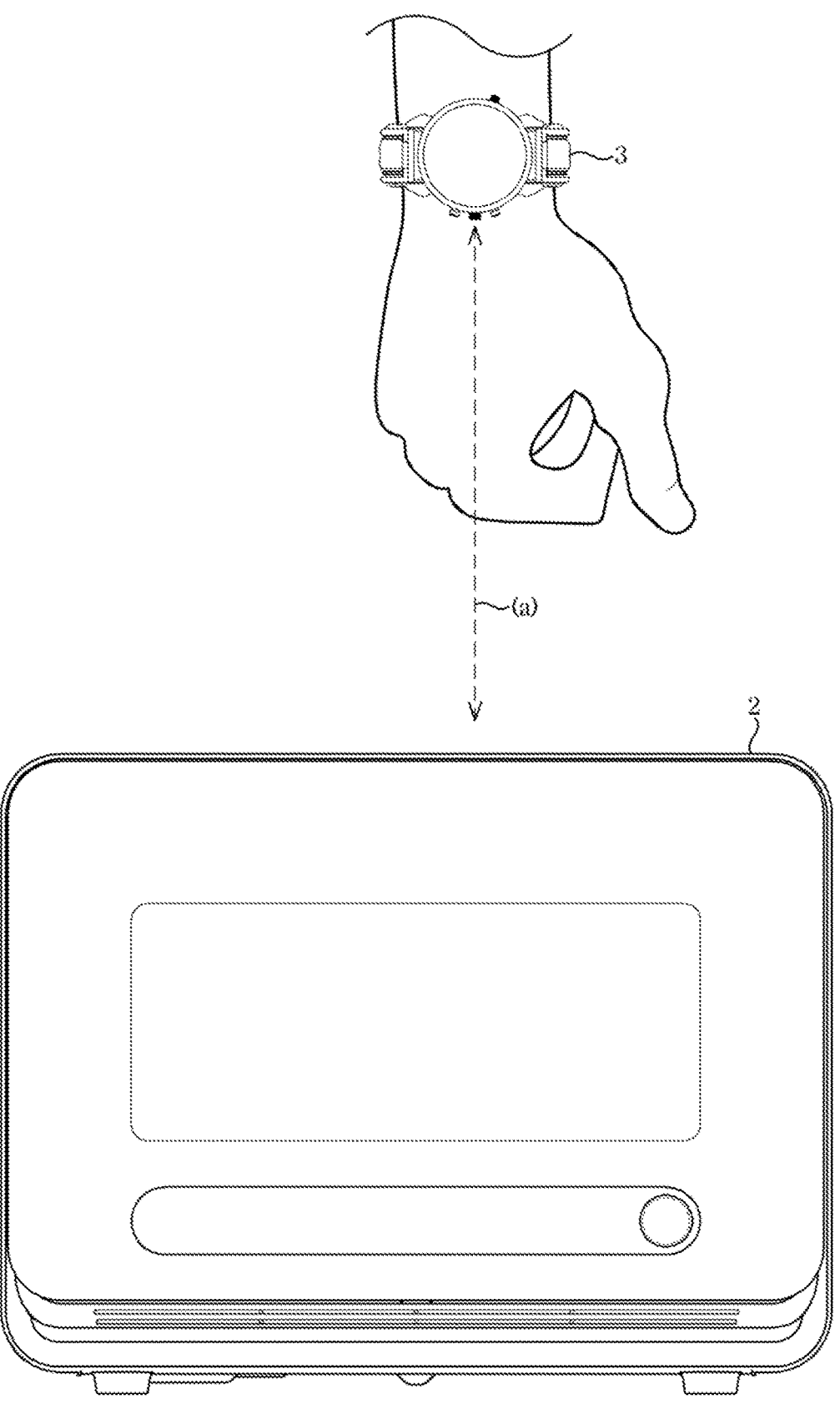
FIG. 8 illustrates an example where a distance between a first electronic device and a second electronic device exceeds a reference distance in an IoT system according to an embodiment.
Figure 9:
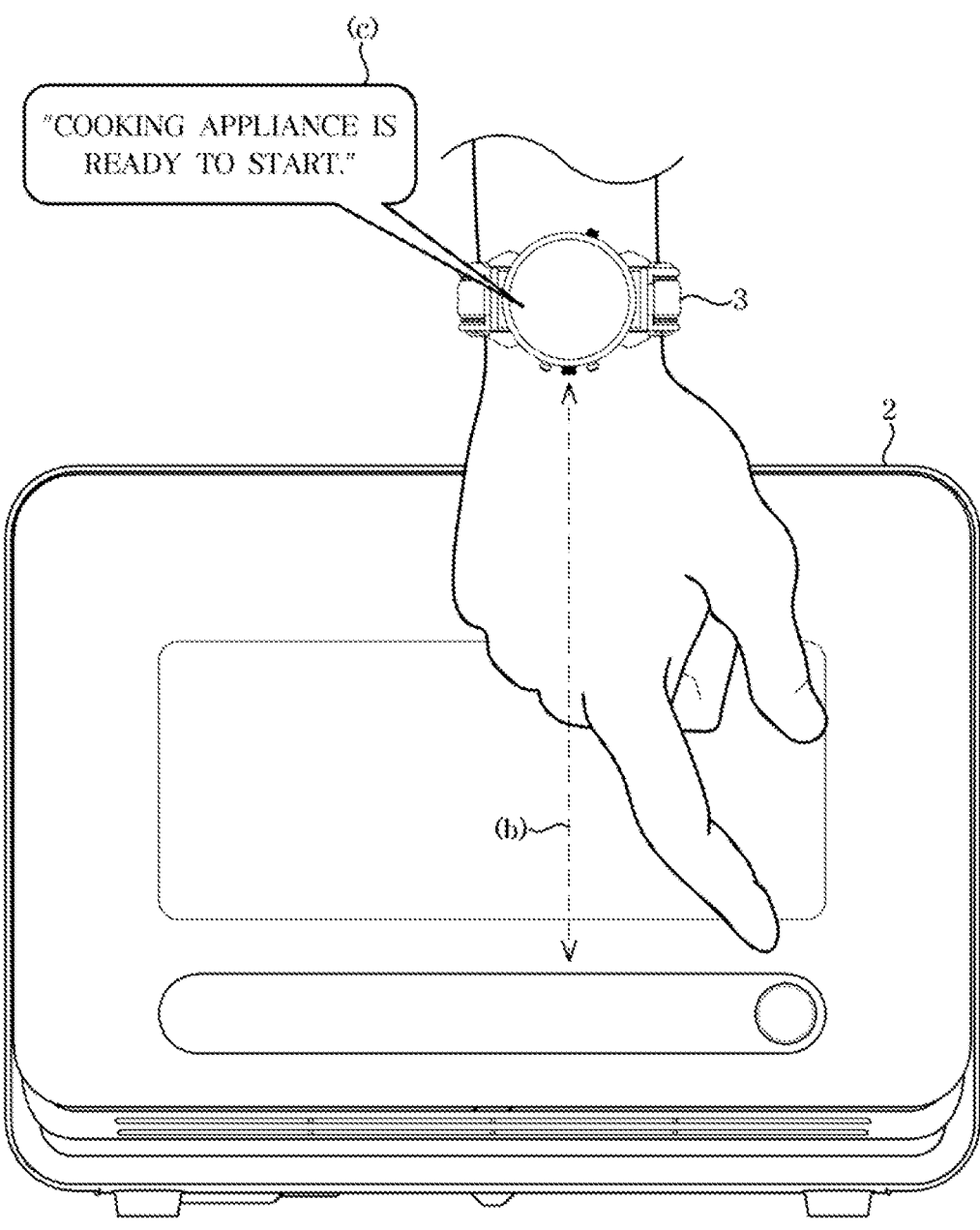
FIG. 9 illustrates an example where a distance between a first electronic device and a second electronic device is less than or equal to a reference distance in an IoT system according to an embodiment.

FIG. 8 illustrates an example where a distance between the first electronic device 2 and the second electronic device 3 exceeds a reference distance in an IoT system according to an embodiment. FIG. 9 illustrates an example where a distance between the first electronic device 2 and the second electronic device 3 is less than or equal to a reference distance in an IoT system according to an embodiment.

In FIG. 8 and FIG. 9, it is assumed that the first electronic device 2 that does not provide a voice guidance function is a cooking appliance, and the second electronic device 3 providing a voice guidance function is a smartwatch.

Referring to FIG. 8, the server device 1 may maintain (store) and update GPS information, included in state information of the first electronic device 2 and the second electronic device 3, in the memory 102. Accordingly, the server device 1 may determine relative positions of the cooking appliance corresponding to the first electronic device 2 and the smartwatch corresponding to the second electronic device 3 in real time, and may identify a distance between the cooking appliance and the smartwatch.

The server device 1 may identify whether the distance a between the cooking appliance and the smartwatch is less than or equal to a preset reference distance. For example, the preset reference distance may be 20 cm, which is a minimum distance required for a user to control the first electronic device 2, and the reference distance may be set by the user.

In response to the distance a between the cooking appliance and the smartwatch exceeding the preset reference distance, the server device 1 may not transmit state change information of the cooking appliance to the smartwatch.

That is, in a case where the distance a between the cooking appliance and the smartwatch exceeds the preset reference distance as shown in FIG. 8, the server device 1 may determine that the user is not operating the cooking appliance, and may maintain a voice guidance function of the smartwatch in a deactivated state.

Referring to FIG. 9, contrary to FIG. 8, in response to a distance b between the cooking appliance and the smartwatch being less than or equal to the preset reference distance, the server device 1 may transmit state change information of the cooking appliance to the smartwatch.

Accordingly, in a case where the distance b between the cooking appliance and the smartwatch is less than or equal to the preset reference distance as shown in FIG. 9, the server device 1 may determine that the user is operating the cooking appliance and switch the voice guidance function of the smartwatch to an activated state.

After the voice guidance function of the smartwatch is activated, as the operating state of the cooking appliance changes, voice guidance on the smartwatch may be performed based on the change in operating state as described above.

According to an embodiment, in response to activating the voice guidance function based on a determination that the distance b between the cooking appliance and the smartwatch is less than or equal to the preset reference distance, the smartwatch corresponding to the second electronic device 3 may notify the user of a start of the voice guidance function.

That is, as shown in FIG. 9, the smartwatch may provide a voice message such as "The cooking appliance is ready to start" at a time that the distance b to the cooking appliance falls below the reference distance. Accordingly, the user may receive a voice notification that he or she is approaching the cooking appliance, and at the same time, may confirm that voice guidance has started through the second electronic device 3.

According to another embodiment, in a case where a plurality of second electronic devices 3 are searched for, the server device 1 may control the voice guidance to be performed by the second electronic device 3 closest to the first electronic device 2.

For example, in a case where a smartwatch and a smart TV are searched as the second electronic device 3 providing a voice guidance function, the server device 1 may identify a distance between the smartwatch and the cooking appliance and a distance between the smart TV and the cooking appliance. In this instance, in a case where the distance between the smartwatch and the cooking appliance is determined to be 20 cm and the distance between the smart TV and the cooking appliance is determined to be 1 m, the smartwatch which is the closest may provide voice guidance. Accordingly, optimal conditions for the user to hear voice guidance while operating the cooking appliance may be met, and simultaneous output of voice guidance from a plurality of second electronic devices 3 may be prevented.

Figure 10:
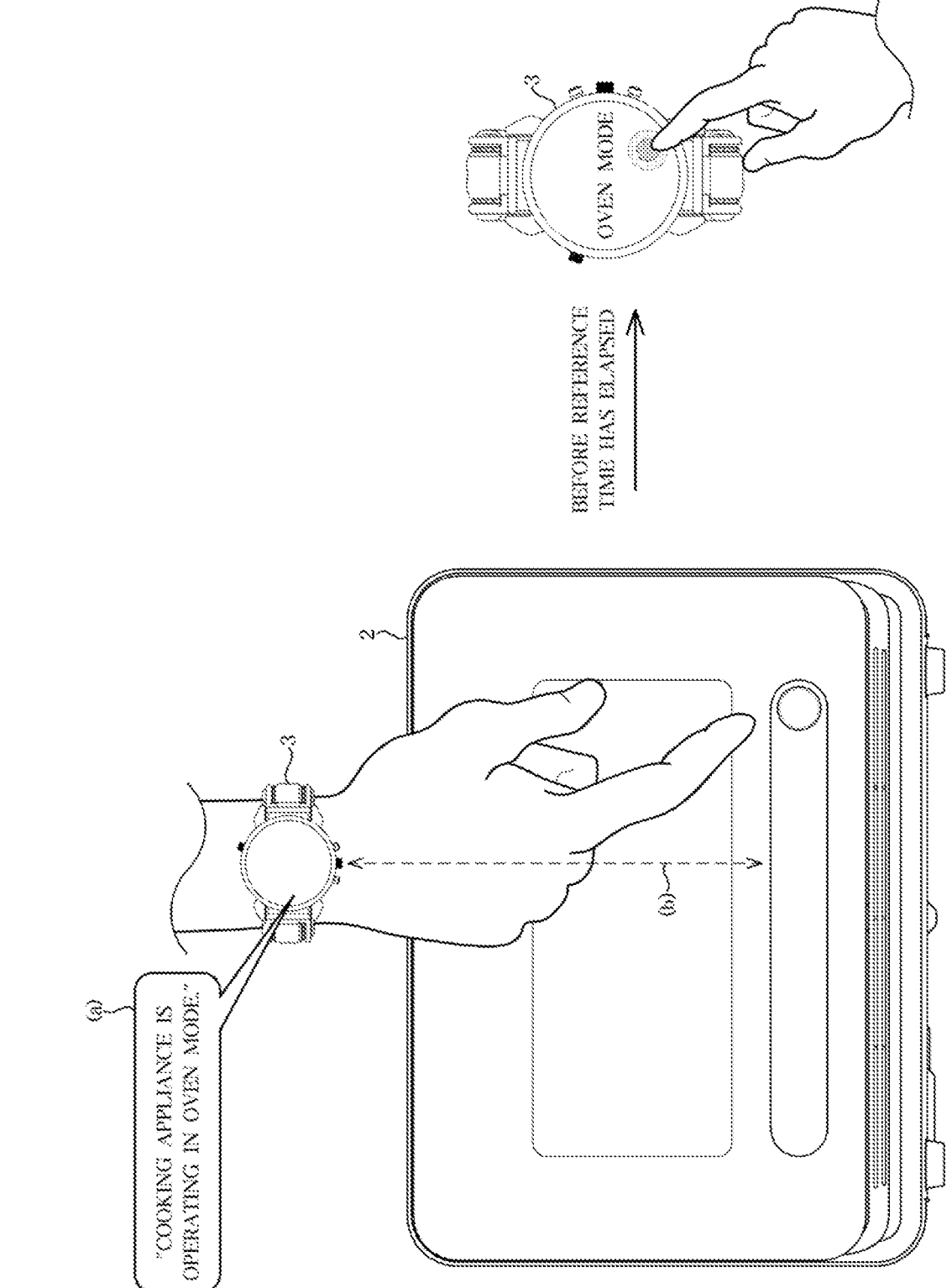
FIG. 10 and FIG. 11 illustrate voice guidance of a second electronic device is reactivated in an IoT system according to an embodiment.
Figure 11:
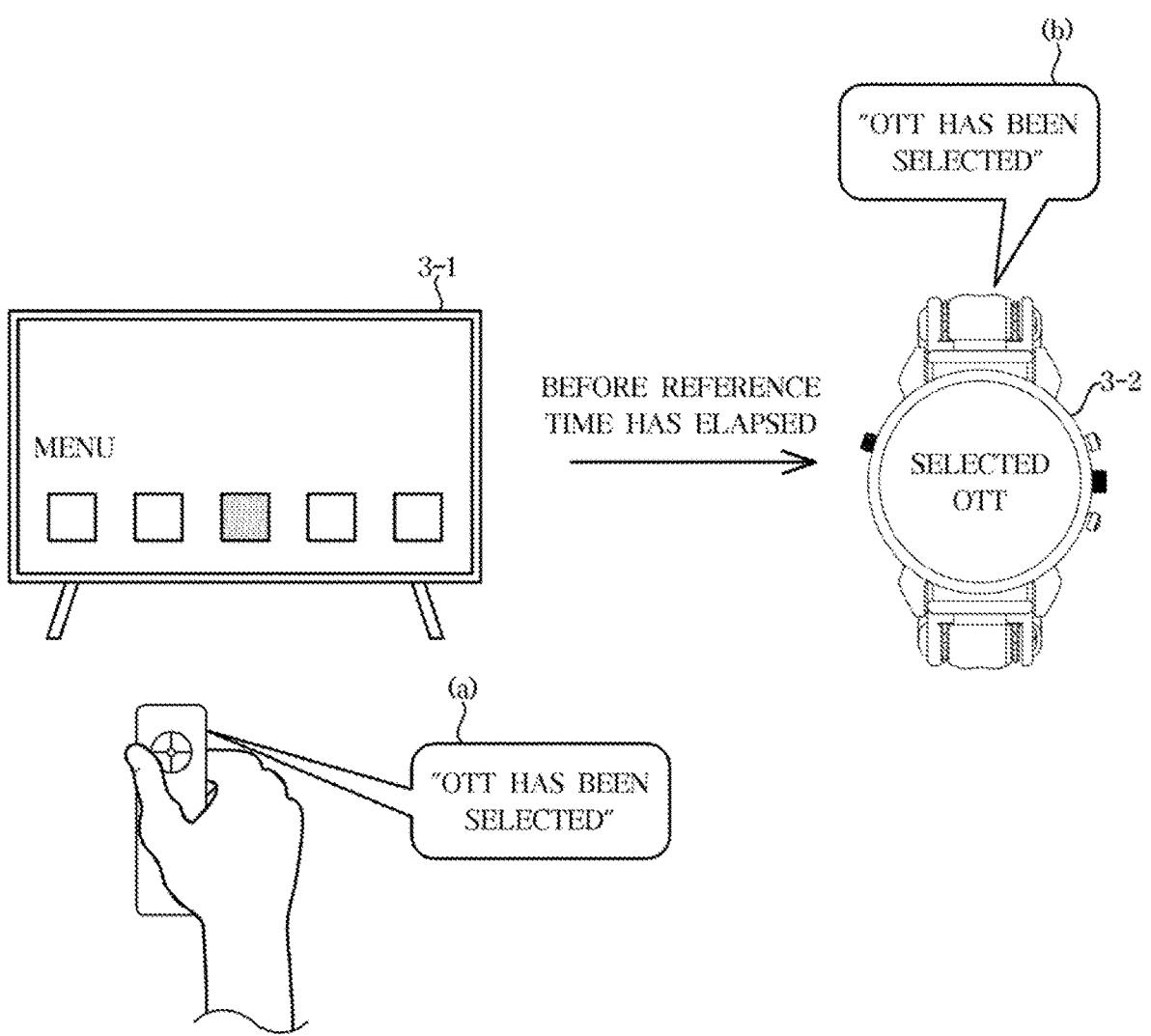

FIG. 10 and FIG. 11 illustrate voice guidance of a second electronic device is reactivated in an IoT system according to an embodiment.

Referring to FIG. 10, in a case where a distance b between a cooking appliance corresponding to the first electronic device 2 and a smartwatch corresponding to the second electronic device 3 is less than or equal to a preset reference distance, the smartwatch may provide voice guidance by outputting a message such as "The cooking appliance is operating in oven mode."

In this instance, a user may not have clearly heard the message provided by the second electronic device 3, or a certain period of time has elapsed after the message, so the user may not be able to discern a current function menu structure and menu position.

In this case, according to the IoT system according to an embodiment, the voice guidance may be provided again through interaction with the second electronic device 3 before a preset reference time has elapsed after the previous voice guidance. In this instance, the interaction with the second electronic device 3 may include simple operations such as touching a screen or clicking a physical button, without being limited thereto.

Accordingly, when a user requires voice guidance again because he or she did not clearly hear the voice guidance or a certain period of time has elapsed after the voice guidance, the user may receive voice guidance again by simply interacting with the second electronic device 3 without operating the first electronic device 2, thereby increasing user convenience.

Referring to FIG. 11, the embodiment of FIG. 10 may also be applied to a case where voice guidance is auxiliary provided by one of the second electronic devices 3 providing a voice guidance function.

A user may set the second electronic device 3, which provides the voice guidance function, to provide voice guidance instead of the first electronic device 2 which does not provide the voice guidance function, and may also set another second electronic device 3 to provide the voice guidance instead of the second electronic device 3.

For example, as shown in FIG. 11, in a case where a user operates a menu of a smart TV 3-1 corresponding to the second electronic device 3, the smart TV 3-1 may provide voice guidance such as "OTT has been selected".

In this instance, the user may need voice guidance again because he or she was not be able to hear the voice guidance provided by the smart TV 3-1 for various reasons or after a certain period of time has elapsed after the previous voice guidance. Even in this case, according to the user's settings, voice guidance may be provided again by interacting with a smartwatch 3-2 that provides auxiliary voice guidance before a reference time has elapsed after the previous voice guidance.

FIG. 12 is a flowchart illustrating a control method of a server device according to an embodiment.

Referring to FIG. 12, a user may input a user command for controlling the first electronic device 2 to the first electronic device 2 (1200). For example, the user may input a user command to control an operation of the first electronic device 2 or change a state of the first electronic device 2.

The server device 1 may receive changed state information of the first electronic device 2 in response to the user command (1210), and the server device 1 may select the second electronic device 3 whose voice guidance function is not restricted from electronic devices connected to the home network 4 (1220).

The server device 1 may establish communication with the selected second electronic device 3 to allow the selected second electronic device 3 to perform voice guidance (1230). The server device 1 may transmit the changed state information of the first electronic device 2 and a command to activate the voice guidance function to the second electronic device 3 (1240). Accordingly, the server device 1 may allow the second electronic device 3 to perform voice guidance based on changes in the state of the first electronic device 2.

Figure 13:
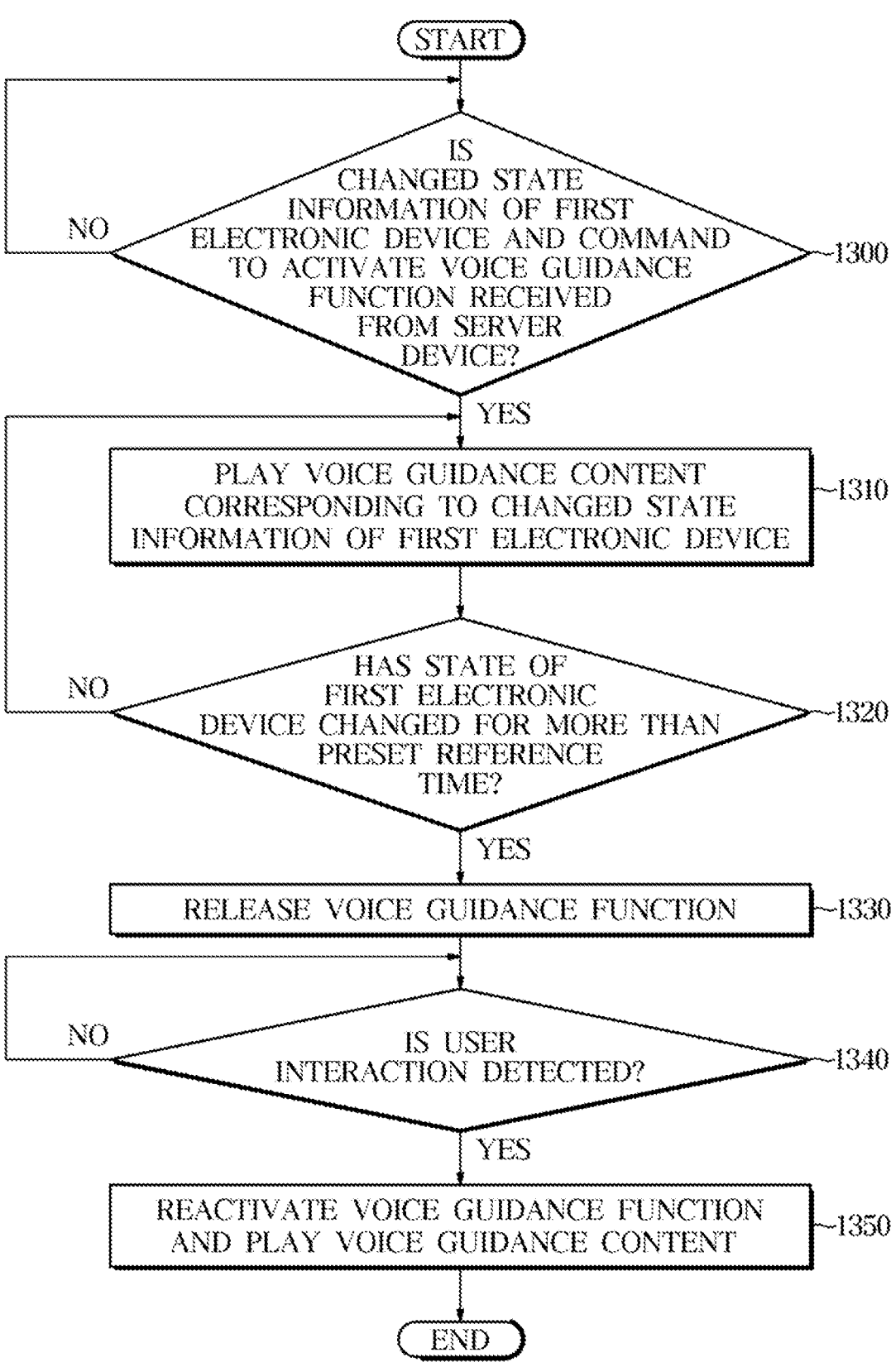
FIG. 13 is a flowchart illustrating a control method of a second electronic device according to an embodiment.

FIG. 13 is a flowchart illustrating a control method of a second electronic device according to an embodiment.

Referring to FIG. 13, the second electronic device 3 may identify whether the changed state information of the first electronic device 2 and the command to activate the voice guidance function is received from the server device 1 (1300). Based on the changed state information and the activation command identified as received from the server device 1 (Yes in operation 1300), the second electronic device 3 may play voice guidance content corresponding to the changed state information of the first electronic device 2 (1310).

The second electronic device 3 may identify whether a state of the first electronic device 2 has changed for more than a preset reference time (1320). Based on the state of the first electronic device 2 identified as not changed for more than the preset reference time (Yes in operation 1320), the second electronic device 3 may release the voice guidance function of the second electronic device 3 (1330).

The second electronic device 3 may identify whether a user interaction such as touching a display is detected within a preset reference time after the release of the voice guidance function (1340). In response to the user interaction such as touching a display being detected within the preset reference time after the release of the voice guidance function (Yes in operation 1340), the second electronic device 3 may reactivate the voice guidance function and play voice guidance content (1350). Accordingly, when the user desires to listen to the voice guidance again, the user may receive the voice guidance through a simple interaction without operating the first electronic device 2.

The processor 101 of the server device 1 according to an embodiment may control the communication circuitry 110 to transmit state change information and a command to activate a voice guidance function to the second electronic device 3 whose distance from the first electronic device 2 is less than or equal to a preset reference distance.

The processor 101 may control the communication circuitry 110 to transmit the state change information and the command to activate the voice guidance function to the second electronic device 3 with the highest priority based on priorities set by a user.

The processor 101 may exclude the second electronic device 3, which is set by the user not to use the voice guidance function, from a target for transmitting the state change information and the command to activate the voice guidance function.

The processor 101 may control the communication circuitry 110 to transmit a command to deactivate the voice guidance function to the second electronic device 3, based on the state change information not being received from the first electronic device 2 within a preset reference period of time.

The processor 101 may reactivate the voice guidance function of the second electronic device 3, based on receiving a preset user input from the second electronic device 3 within a reference period of time after transmitting the command to deactivate the voice guidance function.

In a control method of the server device 1 according to an embodiment, the transmitting of the state change information and the command to activate the voice guidance function may transmit the state change information and the command to activate the voice guidance function to the second electronic device 3 whose distance from the first electronic device 2 is less than or equal to a preset reference distance.

The transmitting of the state change information and the command to activate the voice guidance function may transmit the state change information and the command to activate the voice guidance function to the second electronic device 3 with a highest priority based on priorities set by a user.

The control method according to an embodiment may further include excluding the second electronic device 3, which is set by a user not to use the voice guidance function, from a target for transmitting the state change information and the command to activate the voice guidance function.

The control method according to an embodiment may further include transmitting a command to deactivate the voice guidance function to the second electronic device 3, based on the state change information not being received from the first electronic device 2 within a preset reference period of time.

The control method according to an embodiment may further include reactivating the voice guidance function of the second electronic device 3, based on receiving a preset user input from the second electronic device 3 within a reference period of time after transmitting the command to deactivate the voice guidance function.

In an IoT system according to an embodiment, the server device 1 may transmit the state change information and the command to activate the voice guidance function to the second electronic device 3 whose distance from the first electronic device 2 is less than or equal to a preset reference distance.

The server device 1 may transmit the state change information and the command to activate the voice guidance function to the second electronic device 3 with a highest priority based on priorities set by a user.

The server device 1 may exclude the second electronic device 3, which is set by the user not to use the voice guidance function, from a target for transmitting the state change information and the command to activate the voice guidance function.

The server device 1 may control the communication circuitry 110 to transmit a command to deactivate the voice guidance function to the second electronic device 3, based on the state change information not being received from the first electronic device 2 within a preset reference period of time.

The server device 1 may reactivate the voice guidance function of the second electronic device 3, based on receiving a preset user input from the second electronic device 3 within a reference period of time after transmitting the command to deactivate the voice guidance function.

The second electronic device 3 may activate the voice guidance function based on the received command to activate the voice guidance function, and play voice guidance content corresponding to the received state change information.

Based on the state change information being updated after the voice guidance function is activated, the second electronic device 3 may play voice guidance content corresponding to the updated state change information.

Meanwhile, the disclosed embodiments may be implemented in the form of a recording medium that stores instructions executable by a computer. The instructions may be stored in the form of program codes, and when executed by a processor, the instructions may create a program module to perform operations of the disclosed embodiments. The recording medium may be implemented as a computer-readable recording medium.

The computer-readable recording medium may include all kinds of recording media storing instructions that can be interpreted by a computer. For example, the computer-readable recording medium may be read only memory (ROM), random access memory (RAM), a magnetic tape, a magnetic disc, a flash memory, an optical data storage device, etc.

The computer-readable recording medium may be provided in the form of a non-transitory storage medium. The term 'non-transitory storage medium' may mean a tangible device without including a signal (e.g., electromagnetic waves) and may not distinguish between storing data in the storage medium semi-permanently and temporarily. For example, the non-transitory storage medium may include a buffer that temporarily stores data.

The method according to the various embodiments of the disclosure may be provided in a computer program product. The computer program product may be a commercial product that may be traded between a seller and a buyer. The computer program product may be distributed in the form of a storage medium (e.g., a compact disc read only memory (CD-ROM)), through an application store (e.g., Play Store™), directly between two user devices (e.g., smartphones), or online (e.g., downloaded or uploaded). In the case of online distribution, at least part of the computer program product (e.g., a downloadable app) may be at least temporarily stored or arbitrarily created in a storage medium that may be readable to a device such as a server of the manufacturer, a server of the application store, or a relay server.

Although the disclosure has been shown and described in relation to specific embodiments, it would be appreciated by those skilled in the art that changes and modifications may be made in these embodiments without departing from the principles and scope of the disclosure, the scope of which is defined in the claims and their equivalents.

What is claimed is:

1. A server device, comprising:
a communication circuitry configured to communicate with a first electronic device and a second electronic device among a plurality of second electronic devices, each second electronic device among the plurality of second electronic devices configured to connect to the first electronic device via a network and to provide a voice guidance function; and
a controller configured to perform control to:
control the communication circuitry to receive state change information of the first electronic device, and
control the communication circuitry to transmit, to the second electronic device, the received state change information and a command to cause the second electronic device, connected to the first electronic device via the network, to provide the voice guidance function according to a user's operation of the first electronic device,
wherein the second electronic device has a distance from the first electronic device that is less than or equal to a reference distance.

2. The server device of claim 1, wherein
the second electronic device to which the received state change information and the command is transmitted is the second electronic device of the plurality of second electronic devices that the communication circuitry is configured to communicate with, and that are each configured to connect to the first electronic device via the network and to provide a voice guidance function, and that each have a priority set by a user, and
the second electronic device of the plurality of second electronic devices to which the received state change information and the command is transmitted has a highest priority of the plurality of second electronic devices.

3. The server device of claim 1, wherein
the second electronic device to which the received state change information and the command is transmitted is the second electronic device of the plurality of second electronic devices that the communication circuitry is configured to communicate with, and that are each configured to connect to the first electronic device via the network and to provide the voice guidance function,
at least one second electronic device of the plurality of second electronic devices is set by a user not to provide the voice guidance function, and
the controller is further configured to perform control to:
exclude the at least one second electronic device of the plurality of second electronic devices from being a target for transmitting the received state change information and the command.

4. The server device of claim 1, wherein
the controller is further configured to perform control to:
control the communication circuitry to transmit, to the second electronic device, a command to deactivate the voice guidance function based on not receiving updated state change information of the first electronic device within a preset reference period of time.

5. The server device of claim 4, wherein
the second electronic device is configured to reactivate the voice guidance function based on receiving a preset user input within a reference period of time after the command to deactivate the voice guidance function is transmitted.

6. A control method of a server device, the control method comprising:
receiving state change information from a first electronic device; and
transmitting, to a second electronic device among a plurality of second electronic devices, each second electronic device among the plurality of second electronic devices configured to connect to the first electronic device via a network and to provide a voice guidance function, the received state change information and a command to cause the second electronic device, connected to the first electronic device via the network, to provide the voice guidance function according to a user's operation of the first electronic device, wherein the second electronic device has a distance from the first electronic device that is less than or equal to a reference distance.

7. The control method of claim 6, wherein the second electronic device to which the received state change information and the command is transmitted is the second electronic device of the plurality of second electronic devices that the server device is configured to communicate with, and that are each configured to connect to the first electronic device via the network and to provide the voice guidance function, and that each have a priority set by a user, and the second electronic device of the plurality of second electronic devices to which the received state change information and the command is transmitted has a highest priority of the plurality of second electronic devices.

8. The control method of claim 6, wherein the second electronic device to which the received state change information and the command is transmitted is the second electronic device of the plurality of second electronic devices that the server device is configured to communicate with, and that are each configured to connect to the first electronic device via the network and to provide the voice guidance function, at least one second electronic device of the plurality of second electronic devices is set by a user not to provide the voice guidance function, and the control method further comprising:

excluding the at least one second electronic device of the plurality of second electronic devices from being a target for the transmitting the received state change information and the command.

9. The control method of claim 6, further comprising:

transmitting, to the second electronic device, a command to deactivate the voice guidance function based on not receiving updated state change information from the first electronic device within a preset reference period of time.

10. The control method of claim 9, further comprising:

reactivating the voice guidance function based on receiving a preset user input within a reference period of time after the transmitting, to the second electronic device, the command to deactivate the voice guidance function.

11. An Internet of Things (IoT) system, comprising:

a first electronic device;

a second electronic device among a plurality of second electronic devices, each second electronic device among the plurality of second electronic devices configured to connect to the first electronic device via a network and to provide a voice guidance function; and a server device configured to communicate with the first electronic device and the second electronic device, wherein the first electronic device is configured to transmit state change information to the server device, the server device is configured to transmit, to the second electronic device, the state change information received from the first electronic device and a command to cause the second electronic device, connected to the first electronic device via the network, to provide the voice guidance function according to a user's operation of the first electronic device, and the second electronic device has a distance from the first electronic device that is less than or equal to a reference distance.

12. The IoT system of claim 11, wherein the second electronic device to which the received state change information and the command is transmitted is the second electronic device of the plurality of second electronic devices that are each configured to communicate with the server device, and to connect to the first electronic device via the network and to provide the voice guidance function, and that each have a priority set by the user so that a plurality of priorities set by a user corresponds to the plurality of second electronic devices, and the second electronic device of the plurality of second electronic devices to which the received state change information and the command is transmitted has a highest priority of the plurality of priorities set by the user.

* * * * *